US011445010B2

(12) United States Patent
Lie et al.

(10) Patent No.: US 11,445,010 B2
(45) Date of Patent: Sep. 13, 2022

(54) DISTRIBUTED HISTORIZATION SYSTEM

(71) Applicant: AVEVA Software, LLC, Lake Forest, CA (US)

(72) Inventors: Shiewun Lie, Mission Viejo, CA (US); Vinay T. Kamath, Rancho Santa Margarita, CA (US); Ryan Benedict Saldanha, Anaheim, CA (US); Abhijit Manushree, Laguna Niguel, CA (US)

(73) Assignee: AVEVA SOFTWARE, LLC, Lake Forest, CA (US)

( * ) Notice: Subject to any disclaimer, the term of this patent is extended or adjusted under 35 U.S.C. 154(b) by 0 days.

(21) Appl. No.: 16/785,733

(22) Filed: Feb. 10, 2020

(65) Prior Publication Data
US 2020/0396276 A1      Dec. 17, 2020

Related U.S. Application Data

(63) Continuation of application No. 14/704,661, filed on May 5, 2015, now abandoned.

(60) Provisional application No. 62/092,051, filed on Dec. 15, 2014, provisional application No. 61/988,731, filed on May 5, 2014.

(51) Int. Cl.
*H04L 67/10* (2022.01)
*G06F 21/62* (2013.01)

(52) U.S. Cl.
CPC .................................. *H04L 67/10* (2013.01)

(58) Field of Classification Search
None
See application file for complete search history.

(56) References Cited

U.S. PATENT DOCUMENTS

| 6,246,771 | B1 | 6/2001 | Stanton et al. |
| 6,424,429 | B1 | 7/2002 | Takahashi et al. |
| 7,720,818 | B1 | 5/2010 | Laura |
| 8,539,567 | B1* | 9/2013 | Logue ................. H04L 63/0428 726/7 |
| 2002/0184537 | A1 | 12/2002 | Inokuchi et al. |
| 2005/0015488 | A1* | 1/2005 | Bayyapu ............... H04L 67/306 709/225 |
| 2005/0065925 | A1 | 3/2005 | Weissman et al. |
| 2006/0074980 | A1 | 4/2006 | Sarkar |
| 2007/0088741 | A1 | 4/2007 | Brooks et al. |
| 2007/0156650 | A1 | 7/2007 | Becker |
| 2008/0022087 | A1 | 1/2008 | Tsujimoto |

(Continued)

*Primary Examiner* — Lance Leonard Barry
*Assistant Examiner* — Mohammad Yousuf A. Mian
(74) *Attorney, Agent, or Firm* — Greenberg Traurig, LLP

(57) ABSTRACT

A system for historizing process control data. A configurator module registers a data source device with a historian server and indicates to the historian server to generate data source registration information for identifying the registered data source device. The historian server generates and stores the data source registration information. The historian server also generates a connection token comprising the data source registration information. The configurator module forwards the connection token to the data source device, which stores the token and sends it to the historian server with data. The historian server compares the connection token received from the data source device to the connection token stored by the historian server, wherein if they match, the historian server stores the data from data source device.

20 Claims, 8 Drawing Sheets

(56) References Cited

U.S. PATENT DOCUMENTS

| | | |
|---|---|---|
| 2008/0104542 A1 | 5/2008 | Cohen et al. |
| 2008/0133486 A1 | 6/2008 | Fitzgerald et al. |
| 2008/0228880 A1 | 9/2008 | Naresh et al. |
| 2008/0300900 A1 | 12/2008 | Demarest et al. |
| 2009/0064341 A1 | 3/2009 | Hartung et al. |
| 2009/0132655 A1* | 5/2009 | Behrens .................. H04L 51/28 709/204 |
| 2009/0144393 A1 | 6/2009 | Kudo |
| 2009/0287727 A1 | 11/2009 | Hanking |
| 2010/0076946 A1 | 3/2010 | Barker et al. |
| 2011/0231899 A1 | 9/2011 | Pulier et al. |
| 2012/0259652 A1 | 10/2012 | Mallon et al. |
| 2013/0124575 A1 | 5/2013 | Plache et al. |
| 2013/0212129 A1 | 8/2013 | Lawson et al. |
| 2013/0218874 A1 | 8/2013 | Liggett et al. |
| 2013/0221083 A1 | 8/2013 | Doss et al. |
| 2014/0250153 A1 | 9/2014 | Nixon et al. |
| 2014/0280678 A1 | 9/2014 | Nixon et al. |
| 2014/0283140 A1* | 9/2014 | Gorman .................. G06F 21/10 726/30 |
| 2015/0046557 A1 | 2/2015 | Rosenberg |
| 2015/0242412 A1 | 8/2015 | Mathur et al. |
| 2015/0242520 A1 | 8/2015 | Li et al. |
| 2015/0254257 A1 | 9/2015 | Kritchko et al. |
| 2015/0281233 A1* | 10/2015 | Asenjo .................. G06F 9/5072 726/7 |
| 2015/0281355 A1 | 10/2015 | Maturana et al. |
| 2016/0104005 A1 | 4/2016 | Toussaint et al. |
| 2017/0109751 A1 | 4/2017 | Dunkelberger et al. |

* cited by examiner

DISTRIBUTED HISTORIZATION SYSTEM

CROSS REFERENCE TO RELATED APPLICATIONS

This application is a continuation of U.S. application Ser. No. 14/704,661, filed May 5, 2015, entitled "Distributed Historization System", which claims the benefit of and priority to U.S. Provisional Application No. 61/988,731, filed May 5, 2014, entitled "Distributed Historization System." The entire contents of the above identified application are expressly incorporated herein by reference, including the contents and teachings of any references contained therein.

This application claims priority of Madden et al., U.S. provisional application Ser. No. 62/092,051 filed on Dec. 15, 2014, entitled "Data Upload Security in a Historization System." The entire contents of the above identified application are expressly incorporated herein by reference, including the contents and teachings of any references contained therein.

BACKGROUND

Aspects of the present invention generally relate of the fields of networked computerized industrial control, automation systems and networked computerized systems utilized to monitor, log, and display relevant manufacturing/production events and associated data, and supervisory level control and manufacturing information systems. Such systems generally execute above a regulatory control layer in a process control system to provide guidance to lower level control elements such as, by way of example, programmable logic controllers or distributed control systems (DCSs). Such systems are also employed to acquire and manage historical information relating to processes and their associated outputs. More particularly, aspects of the present invention relate to systems and methods for storing and preserving gathered data and ensuring that the stored data is accessible when necessary. "Historization" is a vital task in the industry as it enables analysis of past data to improve processes.

Typical industrial processes are extremely complex and receive substantially greater volumes of information than any human could possibly digest in its raw form. By way of example, it is not unheard of to have thousands of sensors and control elements (e.g., valve actuators) monitoring/controlling aspects of a multi-stage process within an industrial plant. These sensors are of varied type and report on varied characteristics of the process. Their outputs are similarly varied in the meaning of their measurements, in the amount of data sent for each measurement, and in the frequency of their measurements. As regards the latter, for accuracy and to enable quick response, some of these sensors/control elements take one or more measurements every second. Multiplying a single sensor/control element by thousands of sensors/control elements (a typical industrial control environment) results in an overwhelming volume of data flowing into the manufacturing information and process control system. Sophisticated data management and process visualization techniques have been developed to store and maintain the large volumes of data generated by such system.

It is a difficult but vital task to ensure that the process is running efficiently. An aspect of the present invention is a system that stores data from multiple sources and enables access to the data in multiple locations and forms. The system simplifies and streamlines a user's ability to access and analyze data from any location connected to the system. Further, the system maintains a granular system of user access control and advanced data visualization methods.

SUMMARY

Aspects of the present invention relate to a system that stores data from data sources on a server and enables access to the data stored on the server. The system simplifies and streamlines a user's ability to access and analyze data from any location connected to the system. Further, the system maintains a granular system of user access control and data source registration methods.

In one form, a system historizes process control data. The system has a data source device and a configurator module connected to a historian server. The configurator module connects to the historian server. The configurator module registers the data source device with the historian server. The historian server registers the data source device as indicated by the configurator module. The configurator module indicates to the historian server to generate data source registration information for identifying the registered data source device. The historian server generates the data source registration information for identifying the registered data source device as indicated by the configurator module. The historian server stores the data source registration information. The historian server generates a connection token comprising the data source registration information. The historian server sends the connection token to the configurator module. The configurator module receives the connection token from the historian server. The configurator module saves the connection token. The configurator module forwards the connection token to the data source device. The data source device receives the connection token from the configurator module. The data source device stores the connection token. The data source device sends data and the connection token to the historian server. The historian server compares the connection token received from the data source device to the connection token stored by the historian server, wherein if the connection token received from the data source device and the connection token stored by the historian server are found to match, the historian server stores the data from data source device.

In another form, a method is provided.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
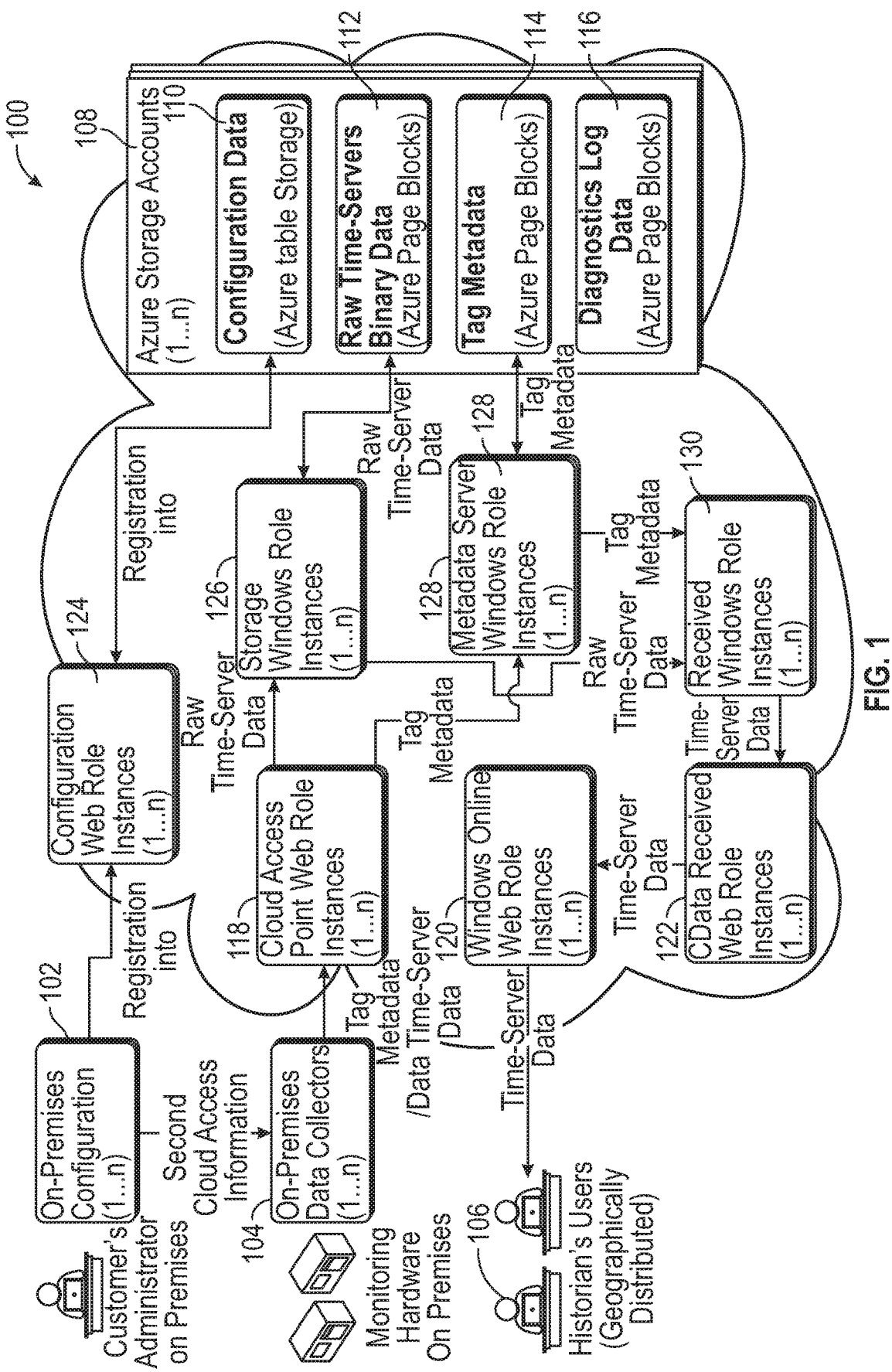
FIG. 1 is a diagram detailing an architecture of a historian system according to an embodiment of the invention.

Referring to FIG. 1, a distributed historian system, generally indicated at 100, enables users to log into the system to easily view relationships between various data, even if the data is stored in different data sources. The historian system 100 can store and use data from various locations and facilities and use cloud storage technology to ensure that all the facilities are connected to all the necessary data. The system 100 forms connections with configurators 102, data collectors 104, and user devices 106 on which the historian data can be accessed. The configurators 102 are modules that may be used by system administrators to configure the functionality of the historian system 100. The data collectors 104 are modules that connect to and monitor hardware in the process control system to which the historian system 100 is connected. The data collectors 104 and configurators 102 may be at different locations throughout the process control system. The user devices 106 comprise devices that are geographically distributed, enabling historian data from the system 100 to be accessed from various locations across a country or throughout the world.

In an embodiment, historian system 100 stores a variety of types of information in storage accounts 108. This information includes configuration data 110, raw time-series binary data 112, tag metadata 114, and diagnostic log data 116. The storage accounts 108 may be organized to use table storage or other configuration, such as page blobs.

In an embodiment, historian system 100 is accessed via web role instances. As shown, configurators 102 access configurator web role instances 124. And data collectors 104 access client access point web role instances 118. Online web role instances 120 are accessed by the user devices 106. The configurators 102 share configuration data and registration information with the configurator web role instances 124. The configuration data and registration information is stored in the storage accounts 108 as configuration data 110. The data collectors 104 share tag metadata and raw time-series data with the client access point web role instances 118. The raw time-series data is shared with storage worker role instances 126 and then stored as raw time-series binary data 112 in the storage accounts 108. The tag metadata is shared with metadata server worker role instances 128 and stored as tag metadata 114 in the storage accounts 108. The storage worker role instances 126 and metadata server worker role instances 128 send raw time-series data and tag metadata to retrieval worker role instances 130. The raw time-series data and tag metadata is converted into time-series data and sent to the online web role instances 120 via data retrieval web role instances 122. Users using the user devices 106 receive the time-series data from the online web role instances 120.

Figure 2:
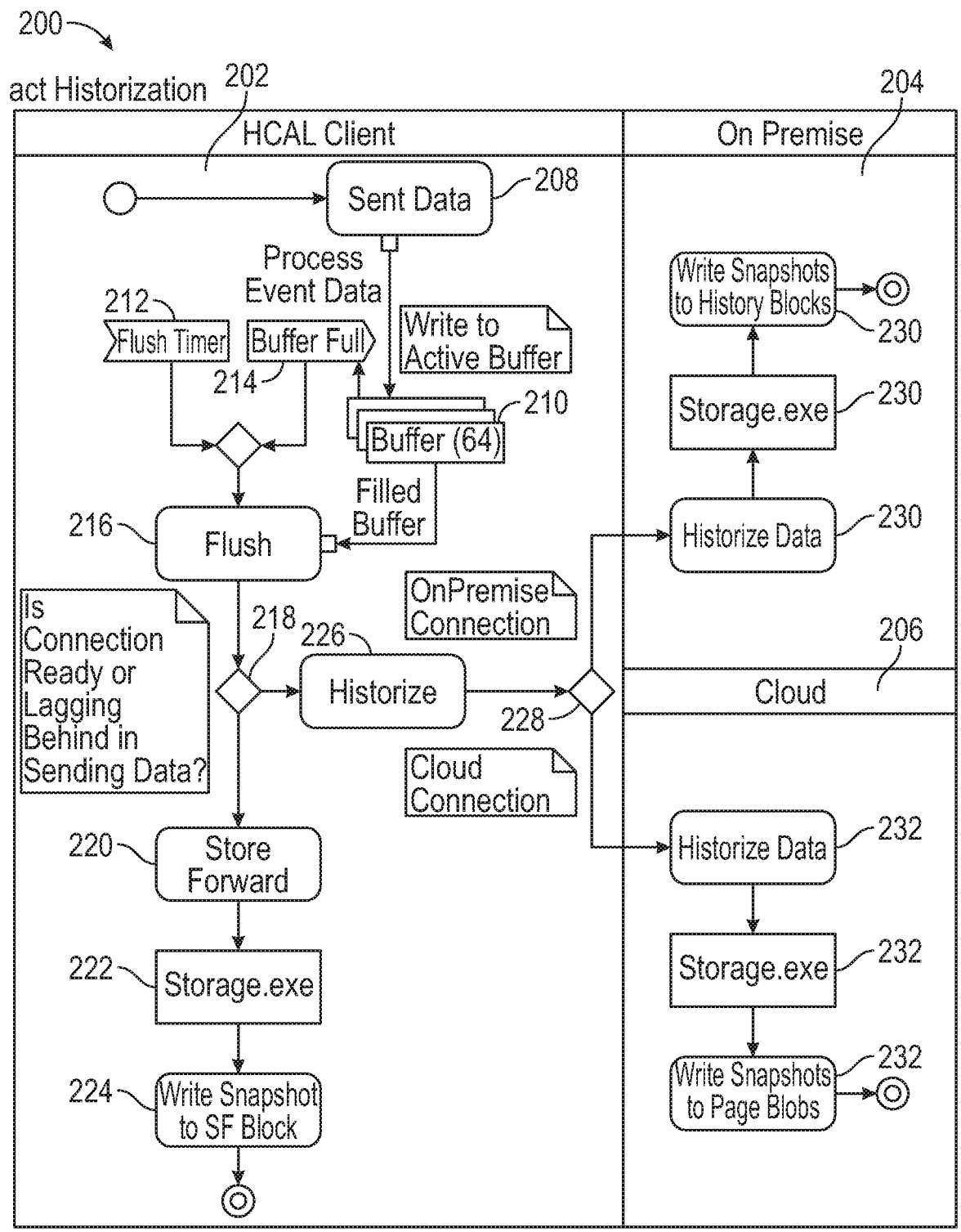
FIG. 2 is an exemplary diagram of a historization workflow performed by the system of FIG. 1.

FIG. 2 describes a workflow 200 for historizing data according to the described system. The Historian Client Access Layer (HCAL) 202 is a client side module used by the client to communicate with historian system 100. The HCAL 202 can be used by one or more different clients for transmitting data to historian system 100. The data to be sent 208 comes into the HCAL 202 and is stored in an active buffer 210. The active buffer 210 has a limited size. When the active buffer is full 214, the active buffer is "flushed" 216, meaning it is cleared of the data and the data is sent to historian 100. There is also a flush timer 212 which will periodically cause the data to be sent from the active buffer 210, even if the active buffer 210 is not yet full.

When historizing 226, the data may be sent to a historian that is on premises 204 or a historian that stores data in the cloud 206 (step 228). The HCAL 202 treats each type of historian in the same way. However, the types of historians may store the data in different ways. In an embodiment, the on-premises historian 204 historizes the data by storing the data as files in history blocks 230. The cloud historian 206 historizes the data by storing the data in page blobs 232, which enable optimized random read and write operations.

In the event that the connection between HCAL 202 and the historian 204 or 206 is not working properly, the flushed data from the active buffer 210 is sent to a store forward module 220 on the client (step 218). The data is stored 222 in the store forward module 220 in the form of snapshots written to store forward blocks 224 until the connection to the historian is functional again and the data can be properly transmitted. The store forward module 220 may also get rid of data after a certain period of time or when it is full. In those cases, it will send an error to the system to indicate that data is not being retained.

Figure 3:
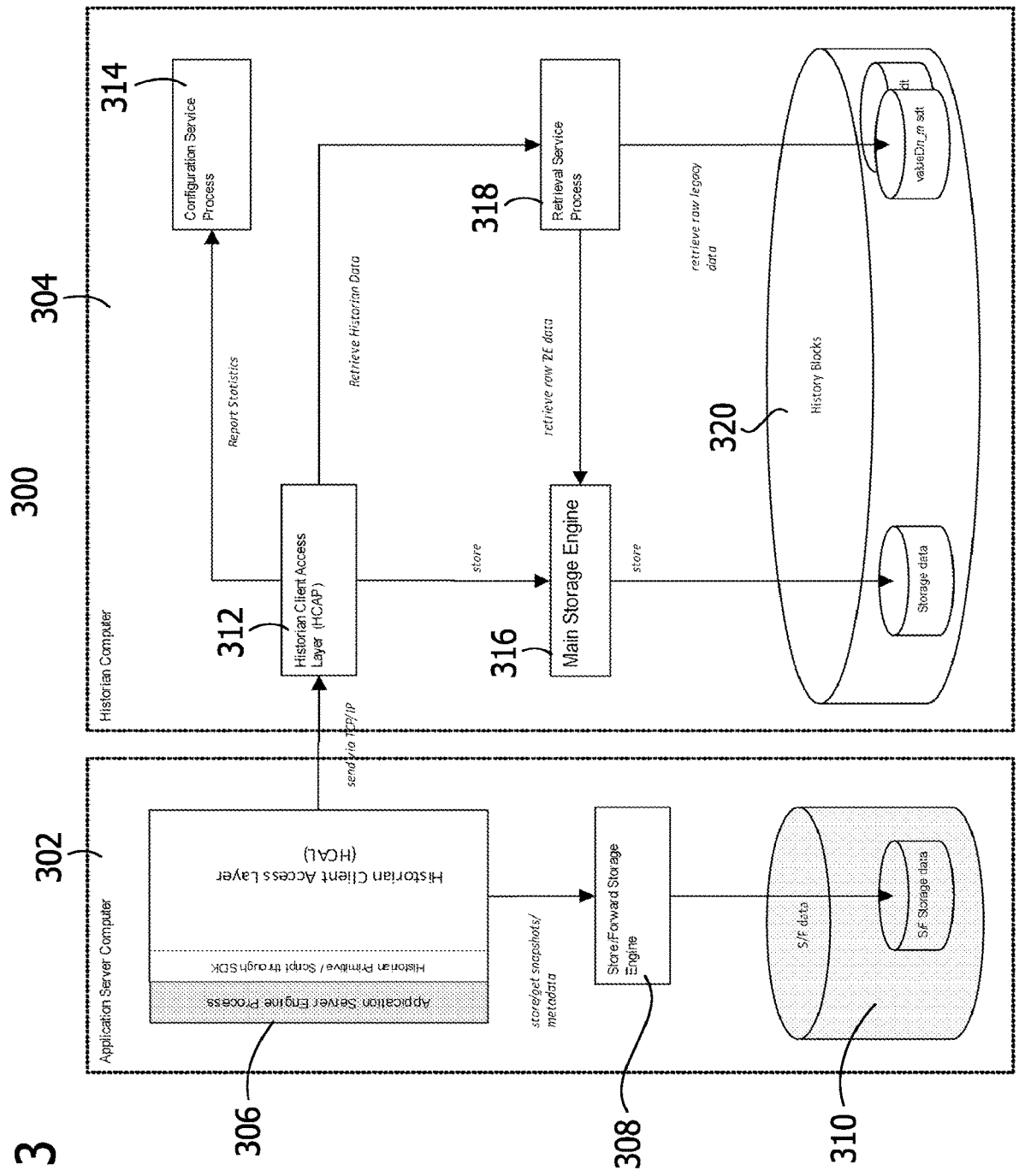
FIG. 3 is an exemplary diagram of the structure of the system of FIG. 1.

FIG. 3 is a diagram 300 displaying the historization system structure in a slightly different way from FIG. 2. An HCAL 306 is hosted on an application server computer 302 and connected to a historian computer 304 and a store forward process 308. The HCAL 306 connects to the historian through a server side module known as the Historian Client Access Point (HCAP) 312. The HCAP 312 has a variety of functions, including sending data received from HCAL 306 to be stored in history blocks 320. The HCAP 312 also serves to report statistics to a configuration service process 314 and retrieve historian data from a retrieval service process 318.

The HCAL 306 connects to the store forward process 308 through a storage engine used to control the store forward process. The Storage Engine enables the HCAL 306 to store and retrieve snapshots and metadata 310 of the data being collected and sent to the historian. In an embodiment, the store forward process 308 on the application server computer 302 is a child Storage Engine process 308 related to a main Storage Engine process 316 running on the historian computer 304.

In addition, HCAL 306 provides functions to connect to the historian computer 304 either synchronously or asynchronously. On successful call of the connection function, a connection handle is returned to client. The connection handle can then be used for other subsequent function calls related to this connection. The HCAL 306 allows its client to connect to multiple historians. In an embodiment, an "OpenConnection" function is called for each historian. Each call returns different connection handle associated with the connection. The HCAL 306 is responsible for establishing and maintaining the connection to the historian computer 304. While connected, HCAL 306 pings the historian computer 304 periodically to keep the connection alive. If the connection is broken, HCAL 306 will also try to restore the connection periodically.

In an embodiment, HCAL 306 connects to the historian computer 304 synchronously. The HCAL 306 returns a valid connection handle for a synchronous connection only when the historian computer 304 is accessible and other requirements such as authentication are met.

In an embodiment, HCAL 306 connects to the historian computer 304 asynchronously. Asynchronous connection requests are configured to return a valid connection handle even when the historian 304 is not accessible. Tags and data can be sent immediately after the connection handle is obtained. When disconnected from the historian computer 304, they will be stored in the HCAL's local cache while HCAL 306 tries to establish the connection.

In an embodiment, multiple clients connect to the same historian computer 304 through one instance of HCAL 306. An application engine has a historian primitive sending data to the historian computer 304 while an object script can use the historian software development kit (SDK) to communicate with the same historian 304. Both are accessing the same HCAL 306 instance in the application engine process. These client connections are linked to the same server object. HCAL Parameters common to the destination historian, such as those for store forward, are shared among these connections. To avoid conflicts, certain rules have to be followed.

In the order of connections made, the first connection is treated as the primary connection and connections formed after the first are secondary connections. Parameters set by the primary connection will be in effect until all connections are closed. User credentials of secondary connections have to match with those of the primary connection or the connection will fail. Store Forward parameters can only be set in the primary connection. Parameters set by secondary connections will be ignored and errors returned. Communication parameters such as compression can only be set by the primary connection. Buffer memory size can only be set by the primary connection.

The HCAL 306 provides an option called store/forward to allow data be sent to local storage when it is unable to send to the historian. The data will be saved to a designated local folder and later forwarded to the historian.

The client 302 enables store/forward right after a connection handle is obtained from the HCAL 306. The store/forward setting is enabled by calling a HCAL 306 function with store/forward parameters such as the local folder name.

The Storage Engine 308 handles store/forward according to an embodiment of the invention. Once store/forward is enabled, a Storage Engine process 316 will be launched for a target historian 304. The HCAL 306 keeps Storage Engine 308 alive by pinging it periodically. When data is added to local cache memory it is also added to Storage Engine 308. A streamed data buffer will be sent to Storage Engine 308 only when the HCAL 306 detects that it cannot send to the historian 304.

If store/forward is not enabled, streamed data values cannot be accepted by the HCAL 306 unless the tag associated with the data value has already been added to the historian 304. All values will be accumulated in the buffer and sent to the historian 304. If connection to the historian 304 is lost, values will be accepted until all buffers are full. Errors will be returned when further values are sent to the HCAL 306.

The HCAL 306 can be used by OLEDB or SDK applications for data retrieval. The client issues a retrieval request by calling the HCAL 306 with specific information about the query, such as the names of tags for which to retrieve data, start and end time, retrieval mode, and resolution. The HCAL 306 passes the request on to the historian 304, which starts the process of retrieving the results. The client repeatedly calls the HCAL 306 to obtain the next row in the results set until informed that no more data is available. Internally, the HCAL 306 receives compressed buffers containing multiple row sets from the historian 304, which it decompresses, unpacks and feeds back to the user one row at a time. Advantageously, network round trips are kept to a minimum. The HCAL 306 supports all modes of retrieval exposed by the historian.

Figure 4:
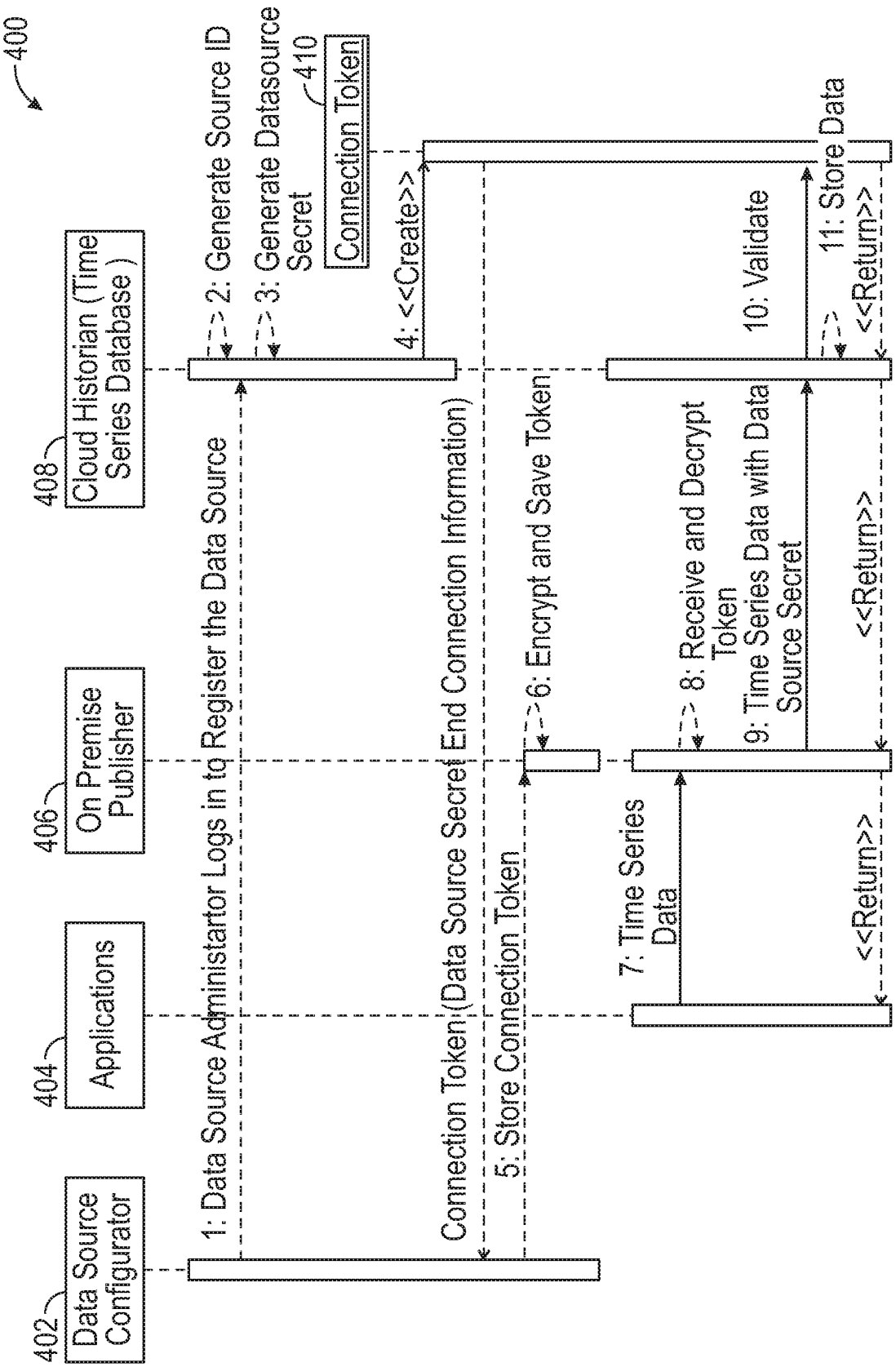
FIG. 4 is an exemplary sequence diagram of the registration of a data source device and uploading of data from the data source device to the historian.

In an embodiment, the system enforces security of communication with the historian on the device level. Devices are required to be registered in order to upload data to the historian. FIG. 4 shows a diagram 400 depicting a method of connection from a data source device, which comprises a configurator module 402, an application module 404, and a publisher module 406, to the historian server 408 in order to upload information. An administrator user first registers the device with the historian using the configurator module 402. The configurator module 402 communicates the attempted registration with the historian 408 to which the device is being registered. A data source ID and data source secret are generated for use by the historian 408 in uniquely identifying the data source device. A connection token 410 comprising the data source secret and connection information is created and sent from the configurator module 402 to the publisher module 406 of the data source device. The connection token 410 is also stored by the historian 408 to enable checking access attempts from the data source device in the future. In this way, the data source device has the token 410 which can be used to access the historian 408 and upload data. The data source ID and data source secret may be stored in the configurator module 402 as a result of a hashing function for increased security. In an embodiment, the connection information in the connection token 410 includes a method of accessing the historian, such as a universal resource locator (URL) link or the like. The publisher module 406 of the data source device may encrypt and store the data source ID, data source secret and connection information for later access to the historian 408. Also, the system uses, for example, an encryption tool such as Data Protection Application Programming Interface (DPAPI) by MICROSOFT or a certificate-based encryption (CBE) system.

When a user needs to upload data from a data source device to the historian 408, they sign into the data source device, which includes the publisher module 406. In an embodiment, the publisher module 406 communicates the user information with a configurator module 402 on the server side and confirms that the user is recognized. If necessary, the user may request a security token, as described below. The data source device then uploads data from the application module 404 to the historian by retrieving the stored connection token 410, decrypting the token if necessary, and sending the data source secret along with the data to be uploaded to the historian 408 over a network connection. Upon receiving the data to be uploaded and the data source secret, the historian 408 compares the secret against the connection token 410 which it has stored from the data source registration process. In an embodiment, if the data source secret is found to be valid, the historian 408 accepts the uploaded data and stores it. If the data source secret is found to be invalid, the historian 408 rejects the uploaded data and does not store it.

The connection between the data source device and the historian 408 can be any secure network connection, such as Hypertext Transfer Protocol Secure (HTTPS) or the like. A data source device maintains the registration information regardless of whether a different user is connected. In the event that a different user logs onto a data source device that is already registered, the data source device need not be registered again. The system will first confirm that the user is allowed to have the access requested and then confirm that the data source device is registered to upload information, as described above.

It may be desirable for a data source device to automatically upload to the historian when no user is logged into the data source device. The above described upload security system also ensures that the data source device is allowed to upload information even when there is no user credentials to check. The data source ID and data source secret are both unique to the data source device to ensure that only those specific data source devices registered with the historian are allowed to connect and upload data.

In an embodiment, a user registering or using a data source device is allowed to upload information through the device, but the user does not have access to the data source ID or data source secret. This ensures that a user cannot copy the data source registration information and use them with another device. The registration information may be strongly encrypted to ensure that it can only be decrypted on the registered device. The registered device may also block certain users or applications from accessing the registration information to ensure upload security by the user using the device or the application running on the device. A user may be denied registration information if the user's security clearance does not include the ability to register new devices with the historian for upload of data.

Figure 5:
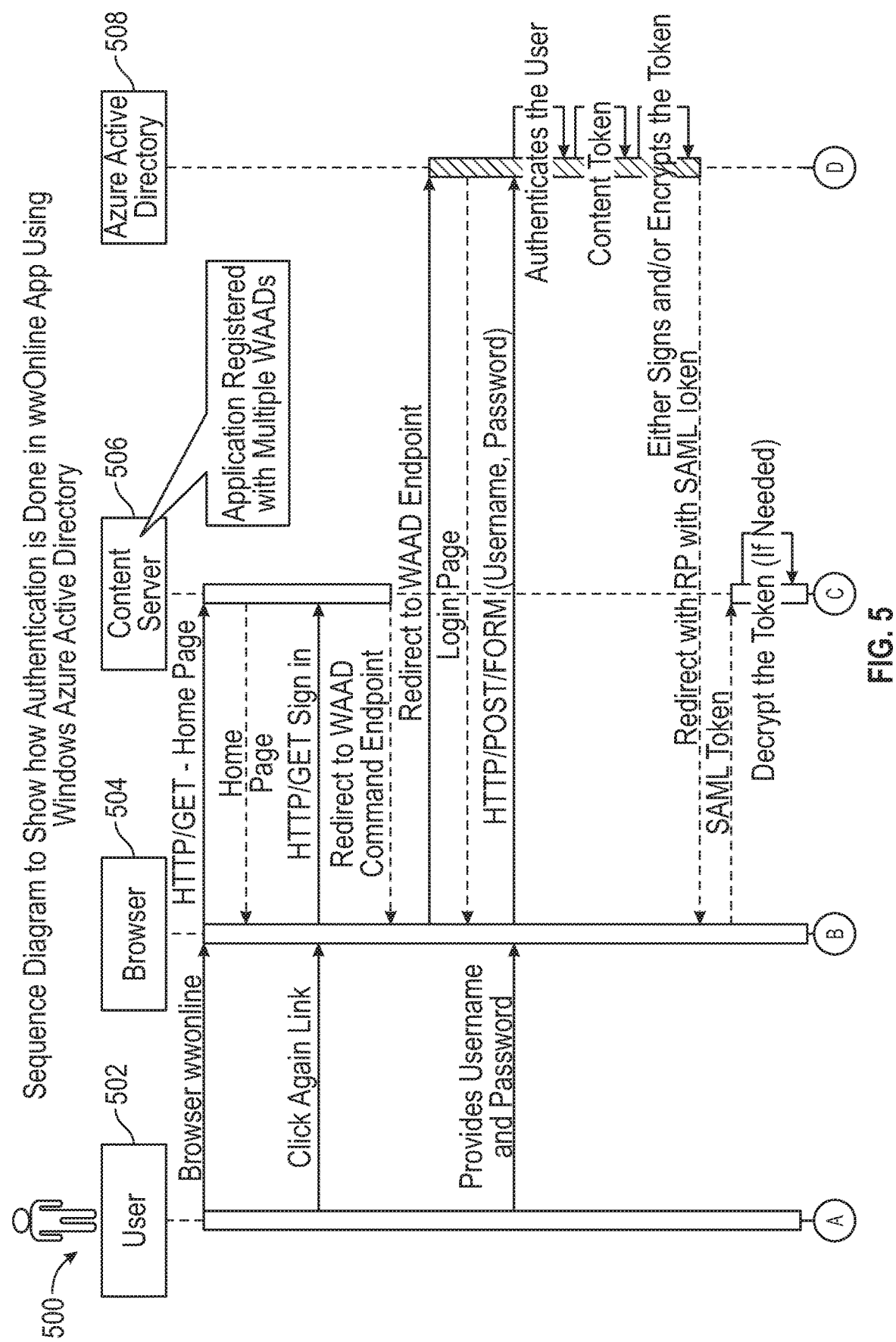
FIG. 5 is an exemplary sequence diagram illustrating how user authentication is done in the system of FIG. 1 using an active directory.
Figure 5:
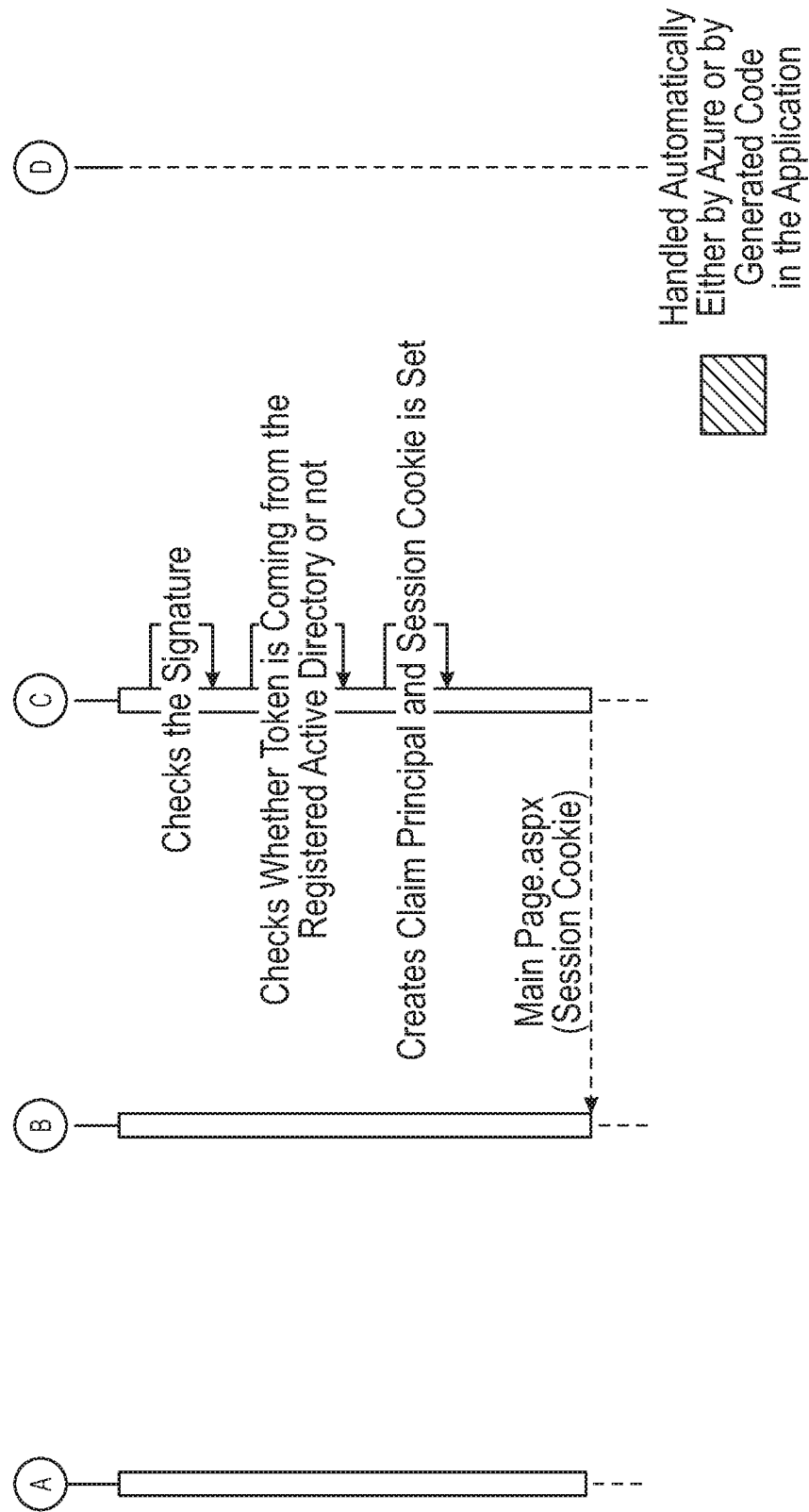

FIG. 5 shows a sequence diagram 500 of the user authentication process. A user 502 may attempt to log in to a content server 506 through a web browser 504. Upon accessing the system home page, the user 502 chooses a "signin link", which redirects the browser 504 to open a login page from an active directory 508. The user 502 enters credentials such as a user name and password to attempt to login to the active directory 508. The active directory 508 authenticates the user's 502 credentials, and if they are satisfactory, the active directory 508 generates a "Security Assertion Markup Language" (SAML) Token, which is returned to the browser 504 for use. In an embodiment, the SAML token is tenant-specific and only grants access to the active directory 508 assigned to the tenant of the user 502.

Once the user 502 has a valid SAML token, he or she is redirected back to the content server 506 to provide a token. The content server 506 confirms that the token is valid and opens a session for the user 502 to access the content on the server. Navigating to the home page (e.g., historian.com) presents a generic home page. Clicking sign-in displays a generic login screen presented by the common active directory. By virtue of the domain portion of the username (for example, onlinecustomer1.historian.com), the user 502 gets authenticated against an active directory 508 that was created for that domain. The system can 'brand' the individual active directory 508 authentication pages. The login page comes from the company specific active directory 508.

Figure 6:
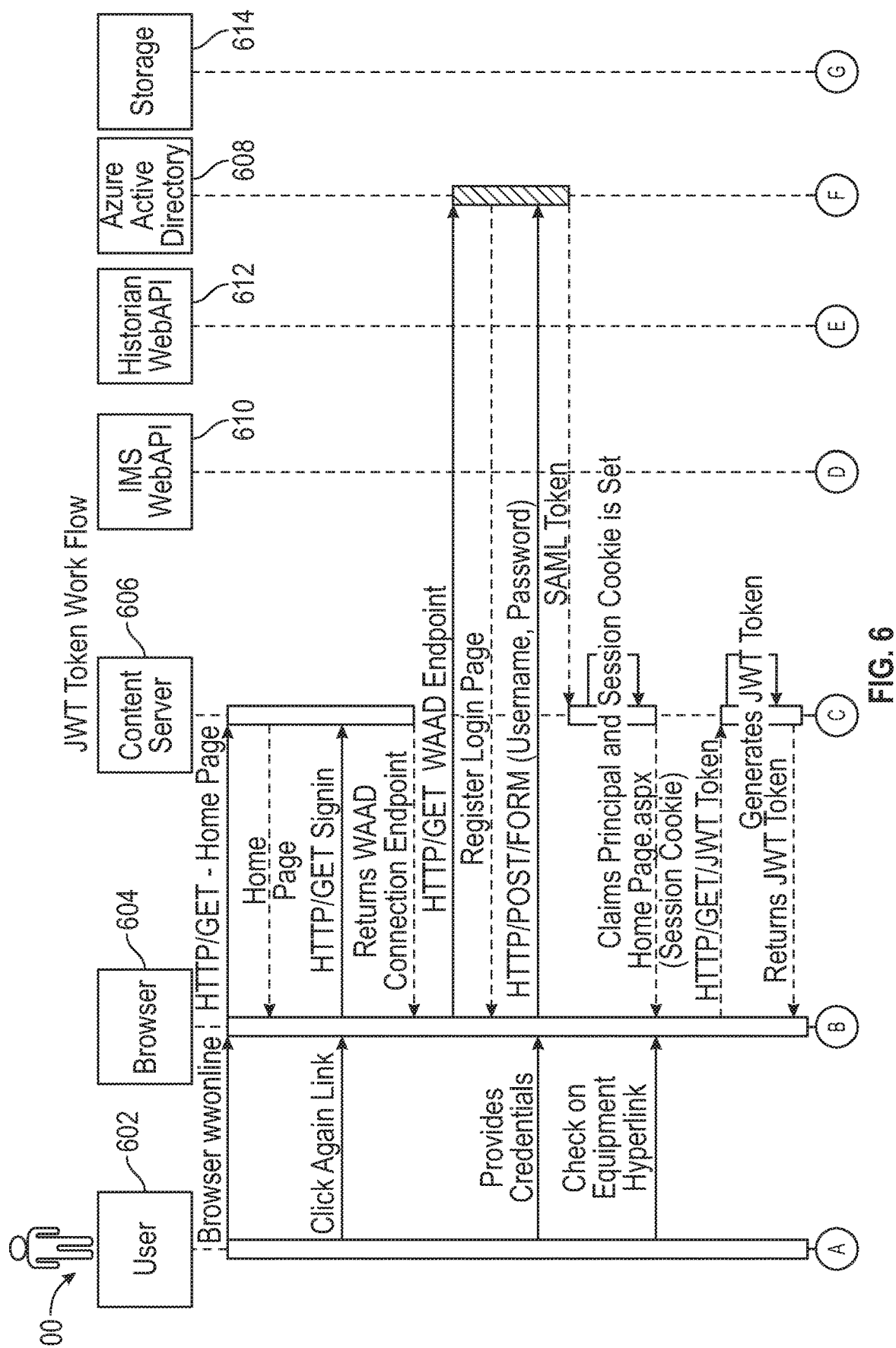
FIG. 6 is an exemplary sequence diagram illustrating user authentication in the system of FIG. 1 including SAML to JWT token conversion.
Figure 6:
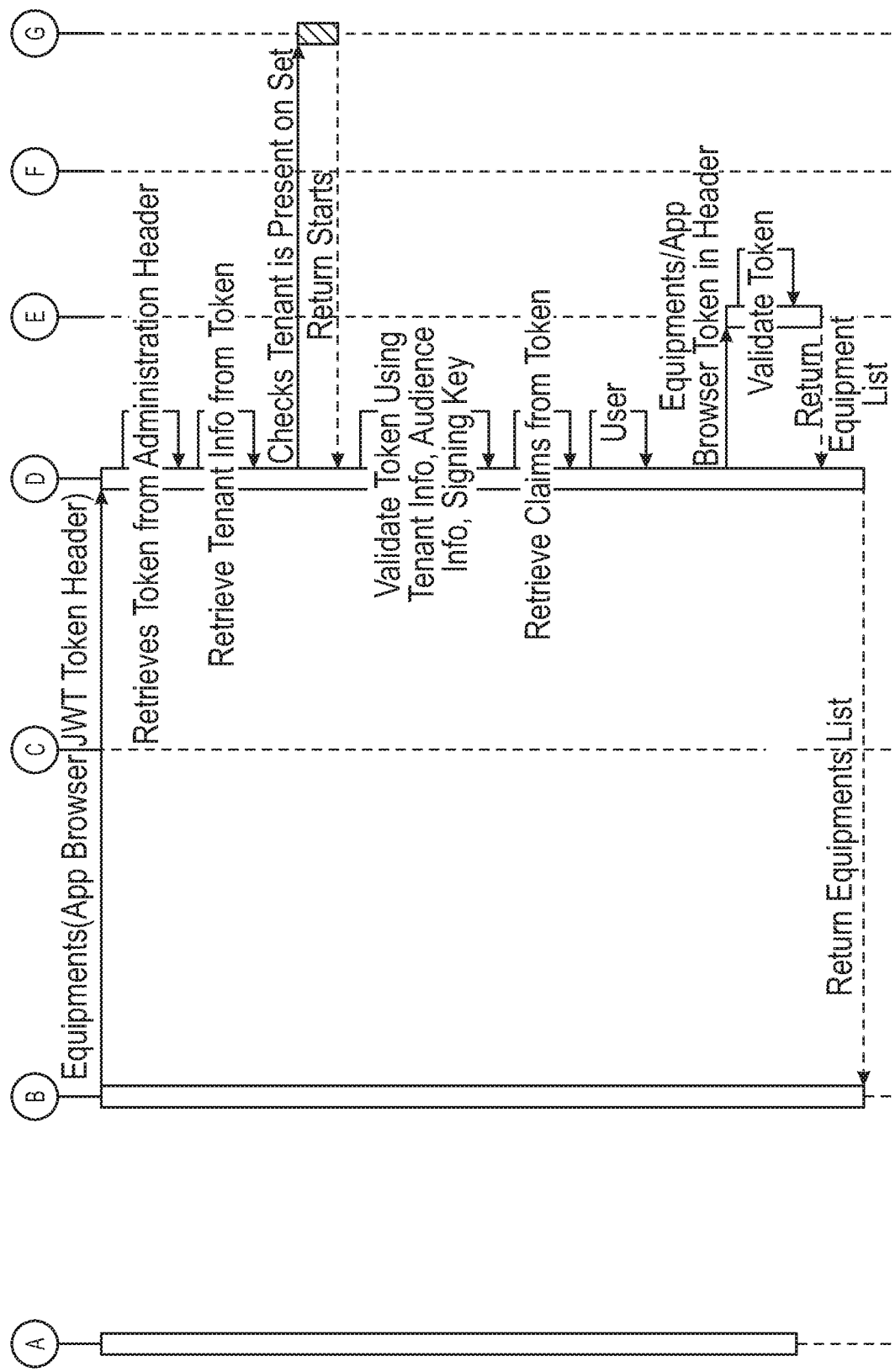

FIG. 6 is a sequence diagram 600 that expands on FIG. 5. A user 602 may want to access certain APIs on the system that require a separate JSON Web Token (JWT) from the SAML token. Once the user 602 has an open session by virtue of having a valid SAML token from the active directory 608, as described above, the user may click on a hyperlink to access some data from a historian storage 614. Accessing the data may require the creation of a JWT. Upon selecting the hyperlink, a content server 606 generates a JWT from the SAML for use with the APIs to access the desired data. A browser 604 sends an HTTP request to a WebAPI 610 containing the valid JWT. The system then validates the JWT against the list of allowed tenants in storage 614 and returns the desired historian data from a historian WebAPI 612 to the user's browser.

The JWT token is a light weight token that can be used on the client side through Internet Explorer and javascript. This enables the system to use the active directory as a backend for authentication and still use a browser to interact with multiple websites that can provide a rich client-like web experience. The use of the JWT eliminates the need for the browser to interact with only its site of origin. In an embodiment, the JWT token is tenant specific and only grants access to data in the active directory or directories assigned to the tenant of the user.

The JWT is used to present evidence of authentication to the data retrieval layers of the architecture. These issued JWT tokens have a very short expiration time and are used once and then discarded. Once the browser has received this token it places it into a HTTP request header and requests data from the content server or WebAPI data layer. These layers authenticate the token by checking its signature, claims, and signing key (this assures that it trusts the original source of the token).

In the process control environment, some users are given control over certain aspects of the control environment and denied access to other aspects. For example, one user is in charge of the line of equipment associated with a process cell. Another user is in charge of a particular type of equipment instantiated throughout several lines of equipment in a process facility. In these kinds of cases, users are permitted access the historian system for aspects of the process control system with which they work with while they are denied access for unrelated aspects.

An embodiment of the present invention uses a small immutable security token to provide a guarantee of the current user in an embodiment. An external trusted token provider issues the token to authenticate the user's identity. In addition the token associates the user with her group membership classes. In the management system discussed above, the token might associate one user with a process cell (e.g., the user who controls a line of equipment) and another user with a particular operation (e.g., the user who works with a particular type of equipment). The security features can extrapolate the user's specific roles and permissions and do any required authorization. Because the security token is passed from a trusted external provider, it can be passed from the historian system to other products that also trust the provider. This in turn allows a single sign-on screen and permits the authentication process to be maintained external to the historian system.

The Abstract and summary are provided to help the reader quickly ascertain the nature of the technical disclosure. They are submitted with the understanding that they will not be used to interpret or limit the scope or meaning of the claims. The summary is provided to introduce a selection of concepts in simplified form that are further described in the Detailed Description. The summary is not intended to identify key features or essential features of the claimed subject matter, nor is it intended to be used as an aid in determining the claimed subject matter.

For purposes of illustration, programs and other executable program components, such as the operating system, are illustrated herein as discrete blocks. It is recognized, however, that such programs and components reside at various times in different storage components of a computing device, and are executed by a data processor(s) of the device.

Although described in connection with an exemplary computing system environment, embodiments of the aspects of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well-known computing systems, environments, and/or configurations that may be suitable for use with aspects of the invention include, but are not limited to, personal computers, server computers, handheld or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the invention may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments of the aspects of the invention may be implemented with processor-executable instructions. The processor-executable instructions may be organized into one or more processor-executable components or modules on a tangible processor readable storage medium. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention is not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and process without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

What is claimed is:

1. A system for providing access to a historian comprising:
   a historian server; and
   a data source device comprising a configurator module, a publisher module, and a non-transitory computer readable medium comprising instructions that when executed by a processor cause the data source device to:
      communicate, by the configurator module, with the historian server and the publisher module;
      accept, by the configurator module, a data source device registration request to register the data source device as a registered data source;
      generate, by the configurator module, a data source ID and a data source secret in response to the data source device registration request;
      send, by the configurator module, the data source ID and the data source secret to the historian server as a historian data source ID and a historian data source secret;
      send, by the configurator module, the data source ID and the data source secret to the publisher module as a client data source ID and a client data source secret;
      receive, by the publisher module, the client data source ID and the client data source secret from the configurator module;
      encrypt, by the publisher module, the client data source ID and the client data source secret;
      receive, by the configurator module, a request for a data upload from the data source device;

compare, by the configurator module, the client data source ID and the client data source secret to the historian data source ID and the historian data source secret, respectively, to check if they are a valid match;

store the data on the historian server if the match is valid; and reject the data upload if the match is not valid;

wherein the data source ID and the data source secret uniquely identifies the registered data source;

wherein the configuration module is configured and arranged to allow automatic uploading from the registered data source to the historian regardless of whether a user is connected to the registered data source; and wherein the system is configured to enforce security of communication with the historian at the data source device.

2. The system of claim 1, wherein the client data source ID and the client data source secret are received together with the data for each data upload request from the registered data source.

3. The system of claim 2, wherein the configurator module is configured and arranged to accept user information from the registered data source, the user information comprising user credentials.

4. The system of claim 3, wherein the configurator module is configured and arranged to accept the data upload from the registered data source even when there are no user credentials to check.

5. The system of claim 4, wherein one or more users registering the registered data source do not have access to the data source ID or the data source secret.

6. The system of claim 5, further comprising the registered data source;

wherein the data source ID and the data source secret are encrypted; and wherein the one or more users cannot copy the data source ID and data secret from the registered data source to another data source device.

7. The system of claim 6, wherein the registered data source is configured and arranged to block one or more users and/or applications from accessing the data source ID and the data source secret.

8. A system for providing access to a historian comprising:

a historian server;

a data source device comprising a non-transitory computer readable medium comprising instructions that when executed by a processor implement:

a configuration module;

wherein the configuration module is configured and arranged to:

communicate with the historian server for providing uploaded data to the historian server;

accept a data source registration request to register the data source device as a registered data source;

generate a data source ID and a data source secret when the data source device registration is requested;

send the data source ID and the data source secret to the historian as a historian data source ID and a historian data source secret;

store the data source ID and the data source secret as a client data source ID and a client data source secret;

receive a request for a data upload;

compare the client data source ID and the client data source secret to the historian data source ID and the historian data source secret, respectively, to check if they are a valid match;

send the data to the historian server if the match is valid; and reject the data upload if the match is not valid;

wherein the configuration module is configured and arranged to accept user information, the user information comprising user credentials;

wherein the configuration module is configured and arranged to accept the data from the registered data source even when there are no user credentials to check; and wherein the system is configured to enforce security of communication with the historian server at the data source device.

9. The system of claim 8, wherein one or more users registering the registered data source do not have access to the data source ID or the data source secret.

10. The system of claim 9, wherein the one or more users and/or applications are blocked from accessing the data source ID and data secret.

11. The system of claim 8, wherein the client data source ID and the client data source secret are received together with the uploaded data for each data upload request from the registered data source.

12. The system of claim 11, wherein one or more users registering the registered data source do not have access to the data source ID or the data source secret.

13. The system of claim 12, wherein the one or more users and/or one or more applications are blocked from accessing the data source ID and data secret.

14. The system of claim 13, further comprising the registered data source;

wherein the client data source ID and the client data source secret are encrypted; and wherein the one or more users cannot copy the client data source ID and/or the client data secret from the registered device to another data source device.

15. The system of claim 14, wherein the registered data source is configured and arranged to block the one or more users and/or the one or more applications from accessing the data source ID and data secret.

16. A system for providing access to a historian comprising:

a historian server; and a data source device comprising a non-transitory computer readable medium comprising instructions that when executed by a processor implement:

a configuration module;

wherein the configuration module is configured and arranged to:

communicate with the historian server;

accept a data source device registration request from a user to register the data source device as a registered data source;

generate a data source ID and a data source secret when the data source registration is requested;

store the data source ID and the data source secret in a historian token on the historian server;

store the data source ID and the data secret in a client token on the registered data source;

receive the client token from the registered data source;

receive a request for a data upload from the registered data source;

compare the historian token to the client token to check if they are a valid match;

store the data on the historian server if the match is valid; and reject the data upload if the match is not valid;

wherein the data source ID and data source secret are received from the registered data source;

wherein one or more users registering the registered data source do not have access to the data source ID or the data source secret; and wherein the system is configured to enforce security of communication with the historian at the data source device.

17. The system of claim 16, wherein the configuration module is configured and arranged to accept user information from the registered data source, the user information comprising user credentials.

18. The system of claim 17, wherein the configuration module is configured and arranged to automatically accept the data source upload from the registered data source even when there are no user credentials to check.

19. The system of claim 18, further comprising the registered data source;

wherein the client data source ID and the client data source secret are encrypted when stored on the registered data source; and wherein the user or a different user cannot copy the data source ID and data secret from the registered data source to another client.

20. The system of claim 19, wherein the registered data source is configured and arranged to block the one or more users and/or one or more applications from accessing the data source ID and the data source secret.

* * * * *